(12) United States Patent
Munekata et al.

(10) Patent No.: US 6,490,392 B1
(45) Date of Patent: Dec. 3, 2002

(54) OPTICAL TRANSMISSION SYSTEM

(75) Inventors: Kenji Munekata, Kanagawa (JP); Shun Kayama, Saitama (JP); Yasuhiro Kataoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/532,433

(22) Filed: Mar. 23, 2000

(30) Foreign Application Priority Data

Apr. 1, 1999 (JP) .......................................... 11-095259

(51) Int. Cl.[7] .............................. G02B 6/30; G02B 6/42
(52) U.S. Cl. ............................ 385/31; 385/88; 385/90
(58) Field of Search ........................... 385/88, 89, 90, 385/91, 92, 49, 50, 52

(56) References Cited

U.S. PATENT DOCUMENTS

| | | | | |
|---|---|---|---|---|
| 4,092,061 A | * | 5/1978 | Stigliani, Jr. ................. | 385/33 |
| 4,756,590 A | * | 7/1988 | Forrest et al. ................ | 385/89 |
| 4,945,400 A | * | 7/1990 | Blonder et al. .............. | 257/116 |
| 5,390,271 A | * | 2/1995 | Priest ............................ | 385/92 |
| 5,553,182 A | * | 9/1996 | Haake .......................... | 385/49 |
| 5,627,981 A | * | 5/1997 | Ackley et al. ................ | 385/88 |
| 5,708,743 A | * | 1/1998 | DeAndrea et al. ............ | 385/88 |
| 5,857,049 A | * | 1/1999 | Beranek et al. .............. | 385/88 |
| 5,859,947 A | * | 1/1999 | Kiryuscheva et al. ........ | 356/153 |
| 5,870,517 A | * | 2/1999 | Wyland ........................ | 385/19 |
| 5,911,022 A | * | 6/1999 | Plickert et al. ............... | 385/49 |
| 5,999,670 A | * | 12/1999 | Yoshimura et al. ........... | 385/31 |
| 6,088,498 A | * | 7/2000 | Hibbs-Brenner et al. ..... | 385/52 |
| 6,132,107 A | * | 10/2000 | Morikawa ..................... | 385/89 |

* cited by examiner

Primary Examiner—John D. Lee
Assistant Examiner—Scott A. Knauss
(74) Attorney, Agent, or Firm—Sonnenschein, Nath & Rosenthal

(57) ABSTRACT

An optical transmission system includes a light emitting device: an optical waveguide portion positioned to and disposed on the light emitting device; and a reflecting means for introducing an optical signal generated by the light emitting device to the optical waveguide portion; wherein the optical waveguide portion has a plurality of cores for transmitting the optical signal and a cladding portion for surrounding the cores; the light emitting device has a plurality of light emitting units for separately generating the optical signals; and the light emitting units are disposed in such a manner as to individually correspond to the cores.

22 Claims, 12 Drawing Sheets

F I G. 8
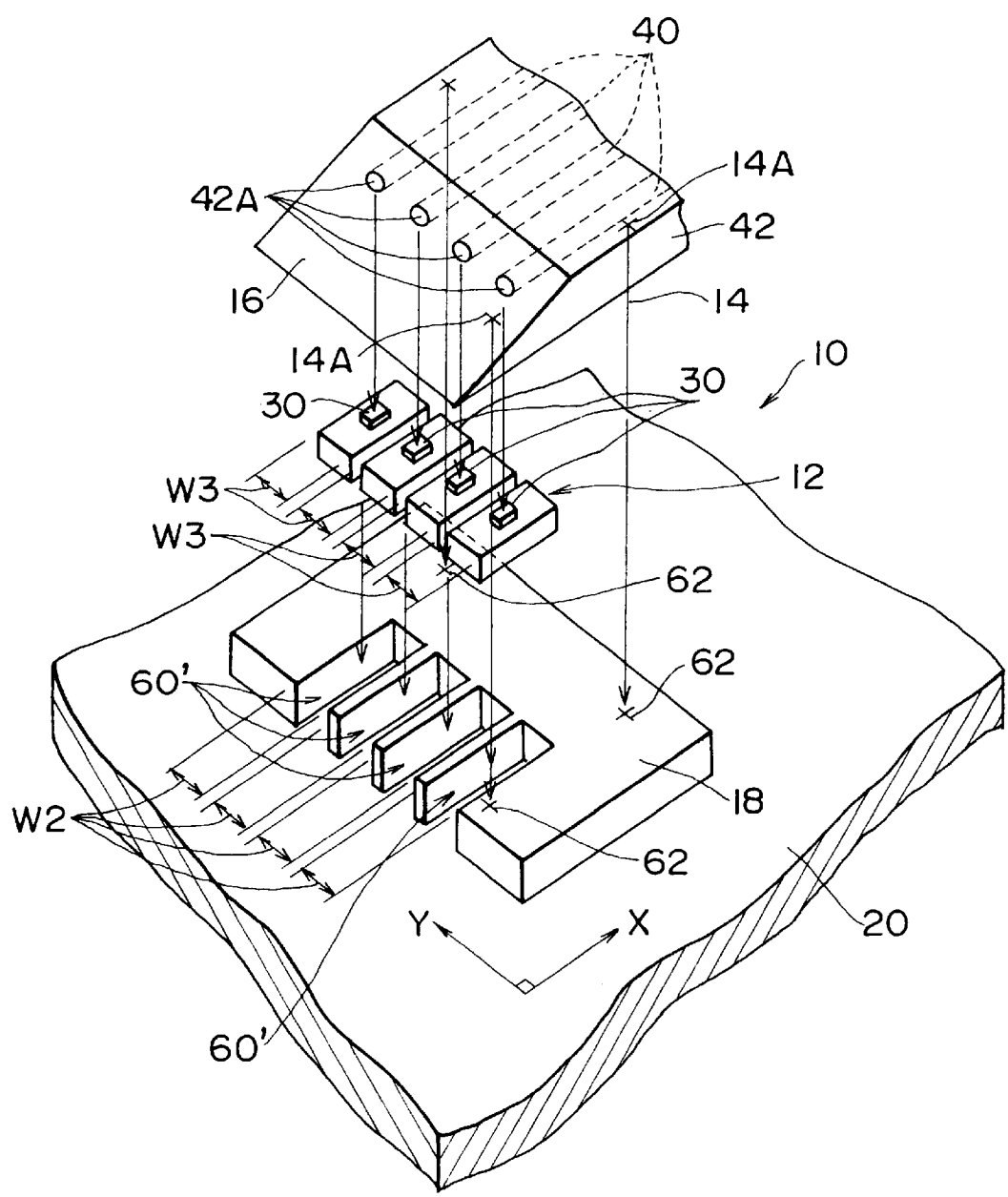

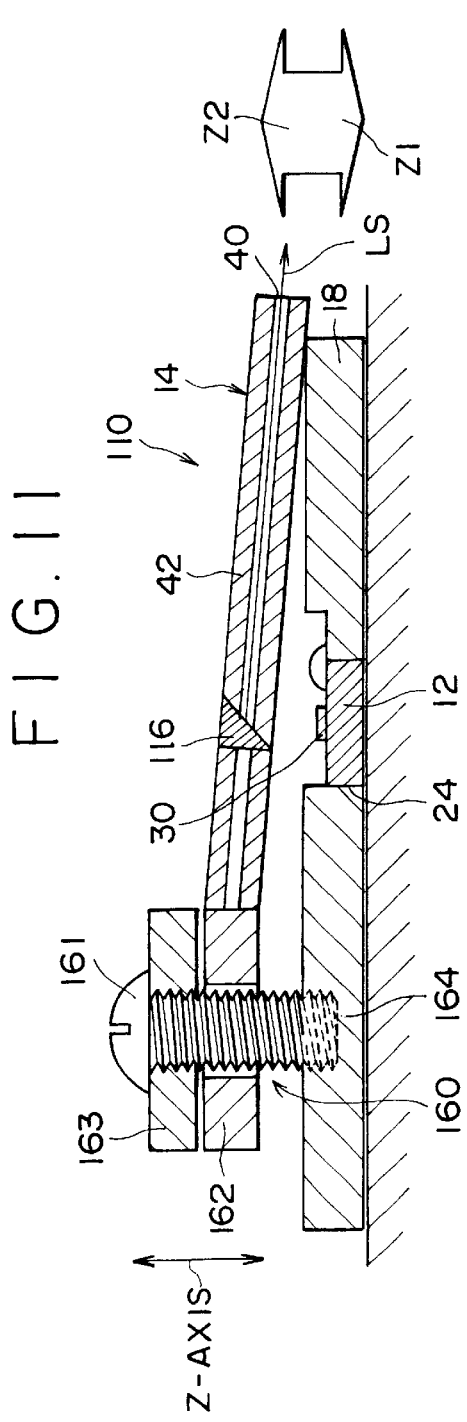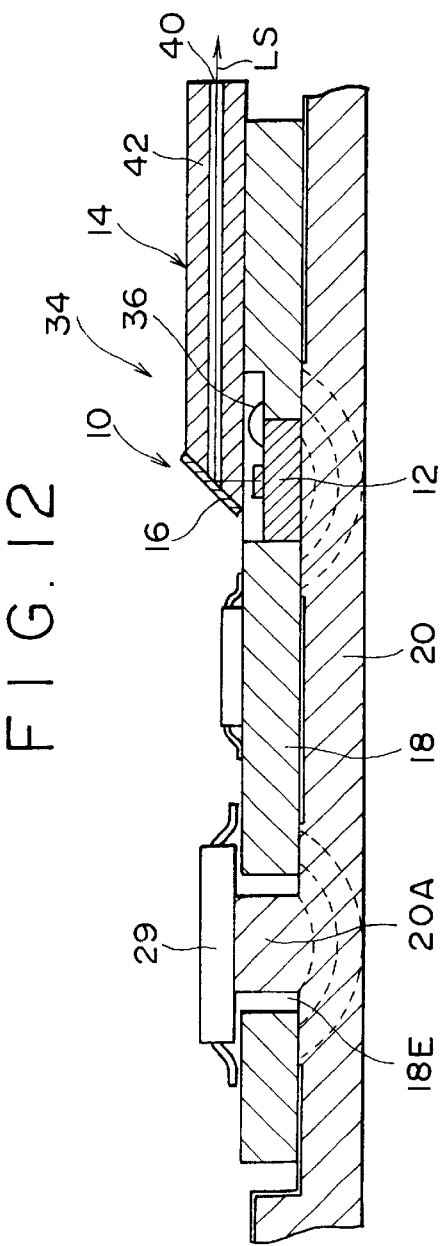

OPTICAL TRANSMISSION SYSTEM

BACKGROUND OF THE INVENTION

The present invention relates to an optical transmission system for supplying an optical signal generated by a light emitting device, and a method of manufacturing the optical transmission system.

The optical transmission system or optical coupling system of this type is configured such that an optical signal generated by a light emitting device is collected at an end portion of optical fibers via an optical lens for allowing the optical signal to be transmitted via the optical fibers. That is to say, an optical signal generated by the light emitting device is colleted by the optical lens and is supplied to the optical fibers.

The optical transmission system of this type has the following problems.

Since the optical lens must be disposed between the light emitting device and the optical fibers, it is required to ensure a space required for providing the optical lens, with a result that the number of parts becomes large, and it is difficult to miniaturize the system.

If the number of the optical fibers used is large, it is also difficult to miniaturize the optical transmission device, and is also difficult to lay out a lot of optical fibers in a desired pattern in a housing of electronic equipment. Accordingly, such a system is disadvantageous in terms of mounting.

Since heat is generated from the light emitting device upon operation, it is required to effectively transfer the heat to the outside.

SUMMARY OF THE INVENTION

An object of the present invention is to provide an optical transmission device capable of realizing the miniaturization, reducing the number of parts, and effectively performing heat radiation, and to provide a method of manufacturing the optical transmission system.

To achieve the above object, according to a first aspect of the present invention, there is provided an optical transmission system including: a light emitting device: an optical waveguide portion positioned to and disposed on the light emitting device; and a reflecting means for introducing an optical signal generated by the light emitting device to the optical waveguide portion; wherein the optical waveguide portion has a plurality of cores for transmitting the optical signal and a cladding portion for surrounding the cores; the light emitting device has a plurality of light emitting units for separately generating the optical signals; and the light emitting units are disposed in such a manner as to individually correspond to the cores.

With this configuration, since an optical signal generated by the light emitting device is reflected by the reflecting means provided on the optical waveguide portion to be introduced to the optical waveguide portion, it is possible to eliminate the need of provision of an optical lens which has been required to be provided separately from the optical waveguide portion, and hence to certainly supply the optical signal generated by the light emitting device to the optical waveguide portion.

Since the optical waveguide portion is composed of a plurality of the cores and the cladding portion for surrounding the cores, it is possible to facilitate the handling of the optical waveguide portion as compared with the conventional configuration in which a plurality of optical fibers are laid out. Since the light emitting units of the light emitting device correspond to the cores, an optical signal generated by each light emitting unit can be certainly supplied to the corresponding core via the reflecting means. Since the reflecting means is provided on the optical waveguide portion, it is possible to reduce the number of parts, and since it is required to provide an optical lens which has been conventionally used, it is possible to miniaturize the system.

In the above optical transmission system, the reflecting means is preferably disposed at an end portion of the optical waveguide portion, or at a midpoint of the optical waveguide portion.

The above optical transmission system preferably further includes a positional adjustment means for adjusting the position of the optical waveguide portion along the direction in which an optical signal is generated by the light emitting device, thereby adjusting the position of the optical waveguide portion to the light emitting device.

By use of the positional adjustment means, it is possible to accurately adjust the position of the optical waveguide portion to the light emitting device along the direction in which an optical signal is generated by the light emitting device.

In the above optical transmission system, the light emitting device is preferably directly disposed on a heat transfer portion.

With this configuration, since heat generated by the light emitting device is directly radiated to the heat transfer portion, it is possible to stably operate the light emitting device by preventing overheat of the light emitting device.

The above heat transfer portion is preferably a housing of electric equipment.

To achieve the above object, according to a second aspect of the present invention, there is provided a method of manufacturing an optical transmission system, including the steps of: disposing a light emitting device in a notch formed in a board in such a manner that the light emitting device is adjustable in its position along a first direction, and is fixed in its position along a second direction perpendicular to the first direction by the board; positioning an optical waveguide to the board; adjusting the position of the light emitting device along the first direction of the board for introducing an optical signal generated by the light emitting device to the optical waveguide portion; and fixing, after completion of the positional adjustment of the light emitting device along the first direction of the board, the light emitting device on the board side.

According to the above configuration, the notch is provided in the board, and the light emitting device is disposed in the notch. In the state in which the light emitting device is disposed in the notch, the light emitting device is adjustable in its position along the first direction and is fixed in its position along the second direction perpendicular to the first direction.

Then, the optical waveguide portion is positioned to the board, and the position of the light emitting device is adjusted along the first direction of the board for introducing an optical signal generated by the light emitting device to the optical waveguide portion. Next, after completion of the positional adjustment of the light emitting device along the first direction of the board, the light emitting device is fixed to the board.

Accordingly, it is possible to accurately perform the relative positioning of the board, optical waveguide portion, and light emitting device only by adjusting the light emitting device along the first direction. Such an optical transmission system does not require the optical lens which has been conventionally used, and therefore, it is advantageous in realizing the miniaturization and reducing the number of parts.

In the above manufacturing method, preferably, the light emitting device has a plurality of light emitting units integrated with each other, and the plurality of light emitting units are disposed in the notch formed in the board.

In the above manufacturing method, preferably, the light emitting device has a plurality of light emitting units separated from each other; the board has a plurality of the notches; and the plurality of light emitting units are disposed in the notches.

BRIEF DESCRIPTION OF THE DRAWINGS

FIG. 8 is an exploded perspective view of the optical transmission system shown in FIG. 7 for illustrating the method of manufacturing the optical transmission system according to the present invention;

FIG. 11 is a sectional view showing a positional adjustment example of the optical transmission system shown in FIG. 10 in the Z-axis direction;

FIG. 12 is a heat-radiation structure example of the optical transmission system of the present invention;

DETAILED DESCRIPTION OF THE PREFERRED EMBODIMENTS

Hereinafter, preferred embodiments of the present invention will be described with reference to the accompanying drawings.

Figure 1:
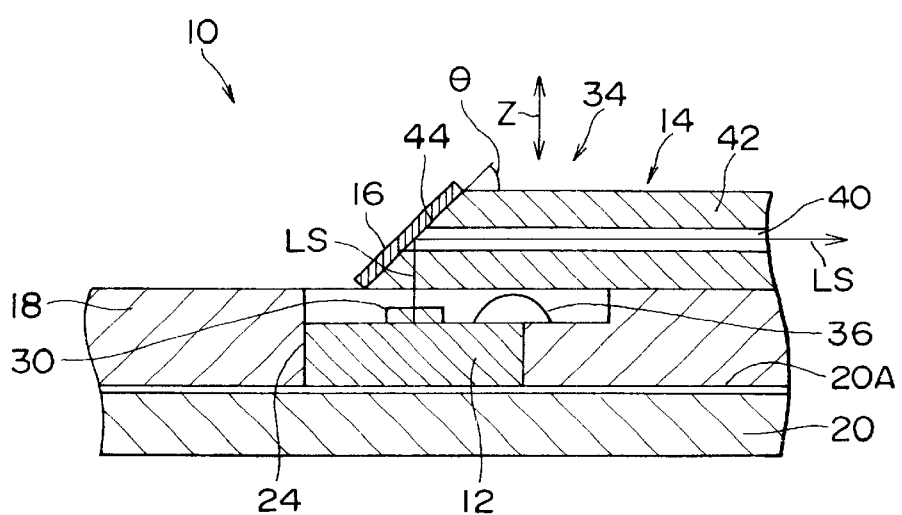
FIG. 1 is a sectional view showing an embodiment of an optical transmission system of the present invention.
Figure 2:
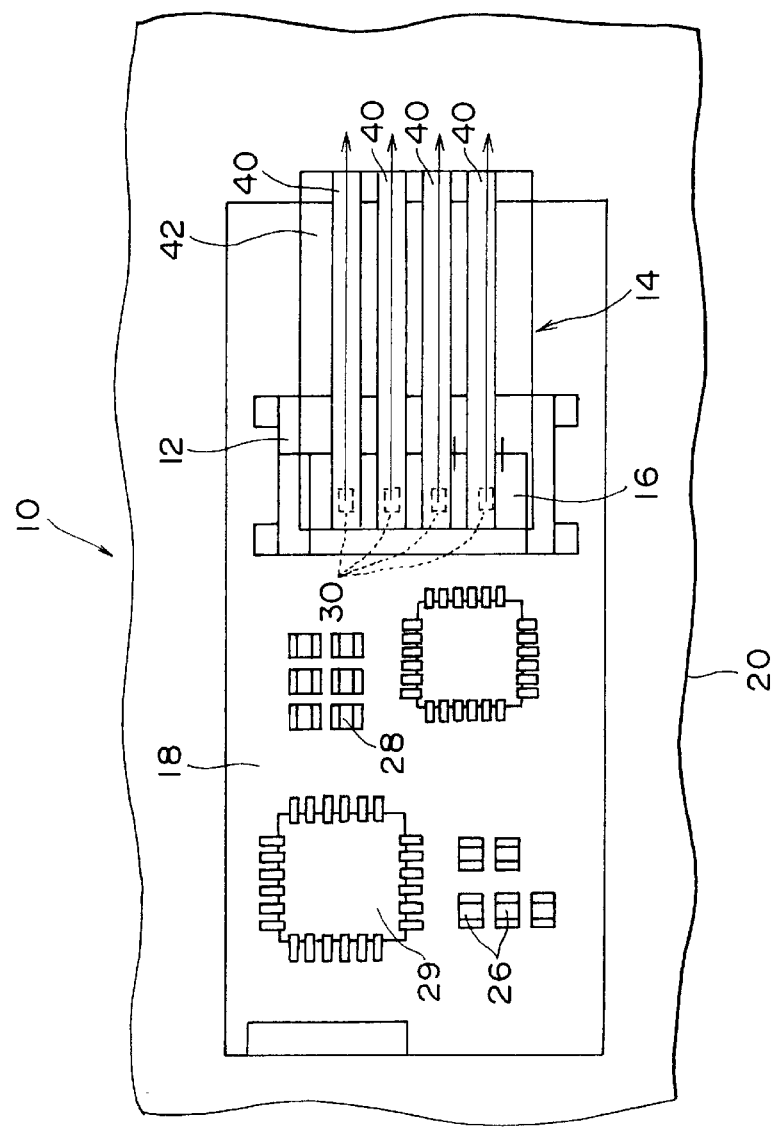
FIG. 2 is a plan view of the optical transmission system show in FIG. 1.

FIGS. 1 and 2 show a preferred embodiment of an optical transmission system of the present invention. An optical transmission system 10, which is also called an optical coupling system, mainly includes a light emitting device 12, an optical waveguide 14, a reflecting mirror 16 as a reflecting means, and a board 18. The optical waveguide 14 is part of an optical guide unit.

The board 18 is mounted on a housing 20 of electronic equipment. The housing 20 serves as a heat transfer portion which has a good heat-conductivity and which functions to radiate heat generated from the light emitting device 12 upon operation and transferred to the housing 20 to the outside. The housing 20 is made from a metal having a good heat-conductivity such as a magnesium alloy, iron, or aluminum.

The light emitting device 12 is disposed in a hole 24 formed in the board 18 in such a manner as to be in direct-contact with an upper surface 20A of the housing 20. The direct-contact of the light emitting device 12 with the housing 20 allows heat of the light emitting device 12 to be directly transmitted to the housing 20 and radiated to the outside. This is effective to stably operate the light emitting device 12.

As shown in FIG. 2, various electronic devices 26 and 28, a driver 29 for driving the light emitting device 12, and the like are disposed on the board 18.

The light emitting device 12 may be typically configured as a plane emission laser. The plane emission laser emits light in the direction perpendicular to the semiconductor board, and allows two-dimensional parallel integration. Each of light emitting units 30 of the light emitting device 12 generates an optical signal LS along the Z direction (in the vertical direction in FIG. 1).

The optical waveguide 14 is disposed on the board 18 in such a manner as to partially cover the hole 24 formed in the board 18. To be more specific, an end portion 34 of the optical waveguide 14 is disposed over the light emitting device 12. The light emitting device 12 is mechanically fixed and electrically connected to the board 18 by means of a wire bonding portion 36.

The optical waveguide 14 includes, as shown in FIG. 2, a plurality of cores 40 and a cladding portion 42 surrounding these cores 40. The cores 40 surrounded by the cladding portion 42 are spaced in parallel from each other at intervals. The light refractive index of the cores is set to be larger than that of the cladding portion.

The end portion 34 of the optical waveguide 14 has a tilt plane 44 from which the cores 40 are exposed. The reflecting mirror 16 as a reflecting means is formed on the tilt plane 44. The reflecting mirror 16 is formed by a thin film made from, for example, aluminum.

The light signal LS generated from each light emitting unit 30 of the light emitting device 12 is reflected from the reflecting mirror 16 at a reflection angle of typically 90° and is transmitted to another transmission object (not shown) via the corresponding core 40. In the embodiment shown in FIGS. 1 and 2, the light emitting device 12 has four pieces of the light emitting units 30, and the optical waveguide 14 has four pieces of the cores 40. It should be noted that the number of the cores is not limited to 4 but may be in a range of 1 to 3 or 5 or more, and also the number of the light emitting units is not limited to 4 but may be in a range of 1 to 3 or 5 or more. In each case, the light emitting units 30 are disposed in such a manner as to be matched with the cores 40. The tilt angle θ of the tilt plane 44 is set to typically 45°.

An operation example of the above-described optical transmission system 10 will be described below.

When the driver 29 shown in FIG. 2 operates the light emitting device 12 on the basis of a command, one, two or more, or all of the light emitting units 30 of the light emitting device 12 each generate an optical signal LS. The direction of the optical signal LS is changed 90°, by the reflecting mirror 16. The optical signal LS is then guided along the corresponding core 40 extending in the horizontal direction shown in FIG. 1, and is supplied to a transmission object.

At this time, heat generated from the light emitting device 12 is directly transferred to the housing 20, and is efficiently radiated from the housing 20 to the outside. If a heat sink for radiation of heat of the light emitting device 12 is additionally provided, there occurs an inconvenience that the system is inevitably enlarged.

The optical transmission system shown in FIGS. 1 and 2, which is also called an optical coupling system, is configured such that the reflecting mirror 16 is directly provided on the optical waveguide 14, and an optical signal LS generated from each light emitting unit 30 is directly reflected from the reflecting mirror 16 and is guided to the corresponding core 40 of the optical waveguide 14. Accordingly, it is possible to eliminate the need of provision of an optical lens which has been required in the conventional system and hence to reduce the number of parts, and also to eliminate the need of provision of a space required for an optical lens and hence to significantly miniaturize the system.

Another embodiment of the optical transmission system of the present invention will be described with reference to FIG. 3.

Figure 3:
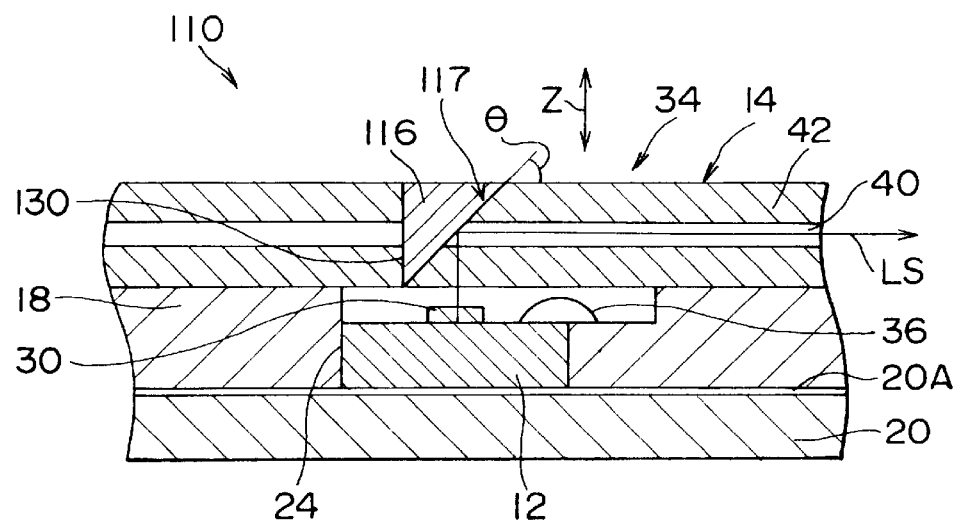
FIG. 3 is a view showing another embodiment of the optical transmission system of the present invention.

An optical transmission system 110 shown in FIG. 3 is different from the optical transmission system 10 shown in FIG. 1 in that a reflecting prism 116 as a reflecting means is provided at a midpoint of the optical waveguide 14. The other parts of the optical transmission system 110, which are the same as those of the optical transmission system 10 shown in FIG. 1, are designated by the same characters, and the overlapped explanation thereof is omitted.

The optical transmission system 110 shown in FIG. 3 is configured such that the reflecting prism 116 is fixedly inserted in a notch 130 formed in the cladding portion 42 and cores 40 of the optical waveguide 14. The reflecting prism 116 is equivalent to the reflecting mirror 16 shown in FIG. 1. An optical signal LS generated from each light emitting unit 30 of the light emitting device 12 is reflected from a reflection plane 117 of the reflecting prism 116 to be changed in its direction by 90°, and is supplied to a transmission object (not shown) along the corresponding core 40.

According to this embodiment, since the reflecting prism 116 is integrally provided in the optical waveguide 14 and also an optical lens having been required in the conventional system is not required, it is possible to reduce the number of parts and to significantly miniaturize the system.

Figure 4:
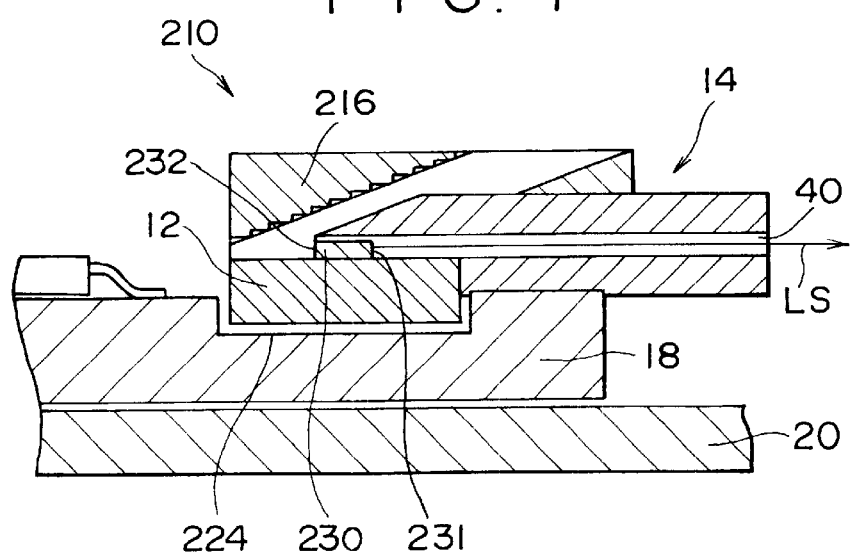
FIG. 4 is a view showing a further embodiment of the optical transmission system of the present invention.

FIG. 4 shows a further embodiment of the optical transmission system of the present invention. An optical transmission system 210 is configured such that the board 18 is directly mounted on the housing 20, and the light emitting device 12 is disposed in a hole 224 formed in the board 18. Each light emitting unit 230 of the light emitting device 12 is designed to generate an optical signal LS from a side surface 231. Accordingly, the side surface 231 is directly disposed on the end portion of the corresponding core 40 of the optical waveguide 14.

A reflecting prism 216 is disposed on the light emitting units 230. The reflecting prism 216 is a portion for reflecting reference light for monitoring outputted from another side surface 232 of each light emitting unit 230 of the light emitting device 12 in order to prevent leakage of the reference light to the outside.

A method of manufacturing (assembling), for example, the optical transmission system 10 shown in FIG. 1 will be described with reference to FIGS. 5 and 6.

Figure 5:
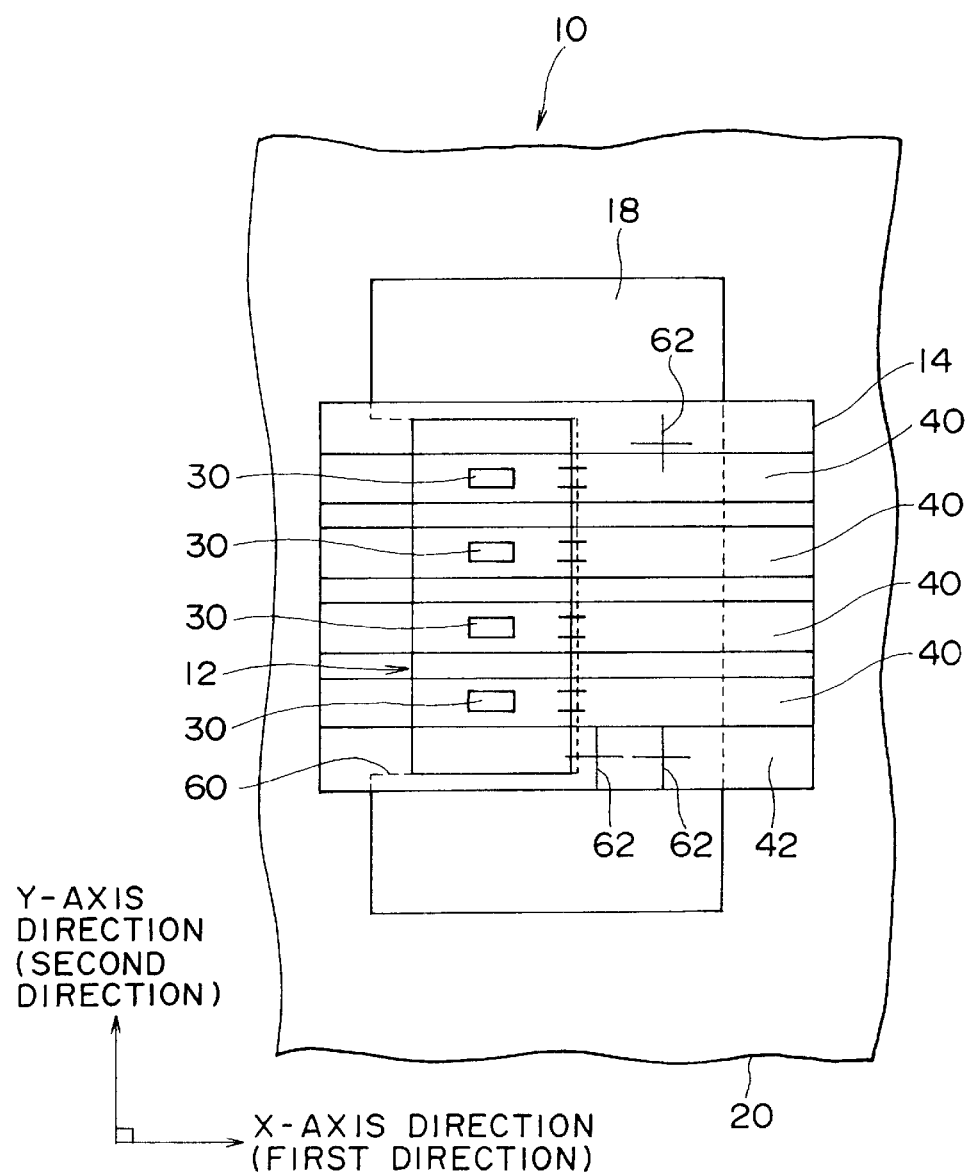
FIG. 5 is a plan view of the optical transmission system provided with light emitting units integrated with each other for illustrating a method of manufacturing the optical transmission system according to the present invention.
Figure 6:
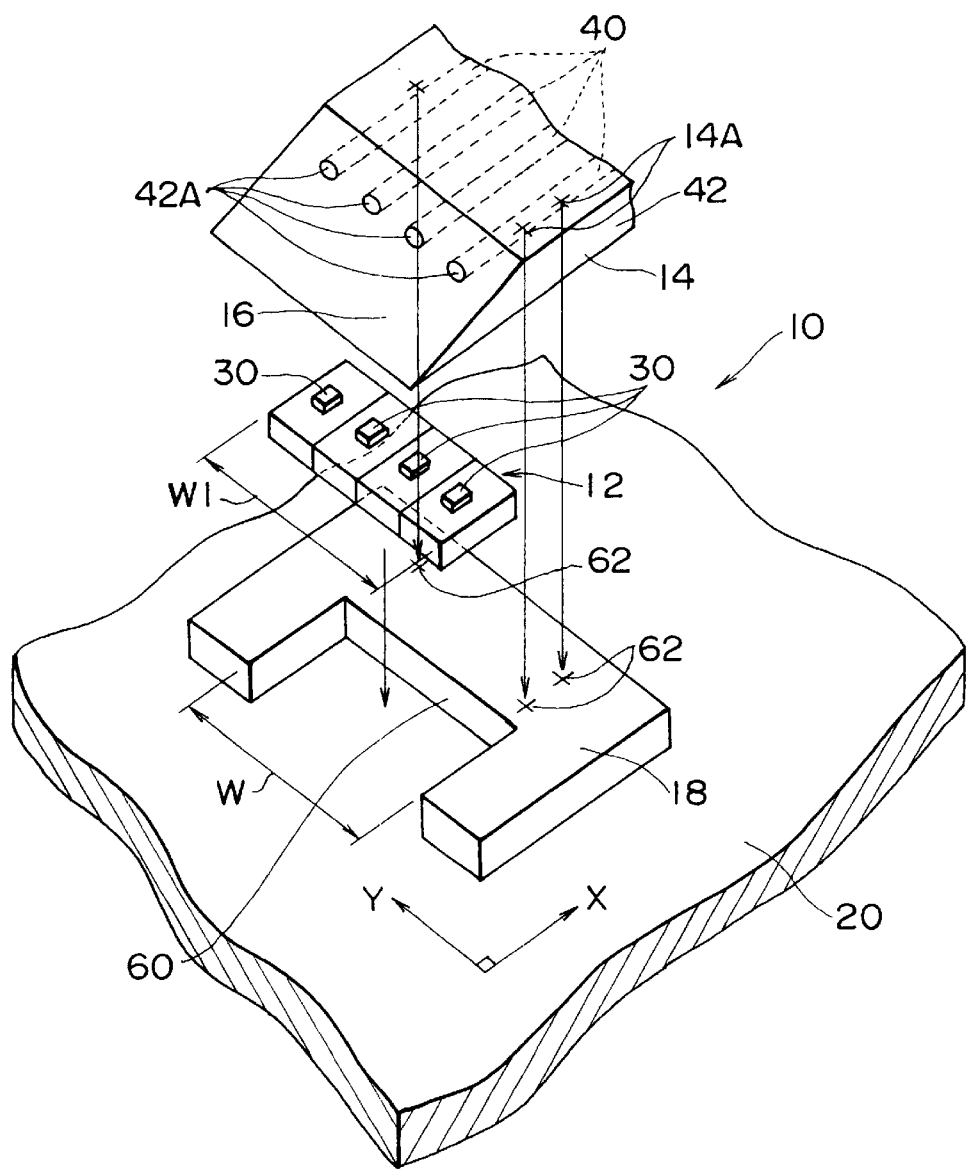
FIG. 6 is an exploded perspective view of the optical transmission system shown in FIG. 5 for illustrating the method of manufacturing the optical transmission system.

FIGS. 5 and 6 show a configuration example of the optical transmission system 10 shown in FIG. 1. The board 18 is formed into a substantially U-shape, and has a notch 60 and three positioning marker 62. The board 18 may be configured as an epoxy based printed board.

FIGS. 5 and 6 show the optical waveguide 14, the light emitting device 12, the board 18, and the housing 20 for electronic equipment. The extending direction of the optical waveguide 14 is taken as an X-axis direction (first direction), and the direction perpendicular to the X-axis direction is taken as a Y-axis direction (second direction).

As shown in FIG. 6, the width W of the notch 60 is nearly equal to the width W1 of the light emitting device 12. In the state in which the light emitting device 12 is inserted in the notch 60 formed in the board 18 as shown in FIG. 5, the light emitting device 12 cannot be moved in the Y-axis direction. The light emitting device 12, however, can be moved in the notch 60 in the X-axis direction for positional adjustment.

Next, a process of assembling the optical transmission system 10 will be described with reference to FIGS. 5 and 6.

First, the light emitting device 12 is inserted in the notch 60 of the board 18. When the light emitting device 12 is inserted in the notch 60, it is fixed in its position in the Y-axis direction but is movable in the X-axis direction for positional adjustment.

Three markers 14A are provided on the optical waveguide 14. The optical waveguide 14 is mounted on the board 18 in such a manner that the markers 14A correspond to the markers 62 on the board 18.

The light emitting device 12 is positioned in the X-axis direction in such a manner that the light emitting units 30 of the light emitting device 12 correspond to end surfaces 42A of the cores 40. In this case, an optical signal LS generated from each light emitting unit 30 and transmitted through the corresponding core 40 is monitored by a measuring meter, and the positional adjustment of the light emitting device 12 in the X-axis direction is performed in such a manner that the optical signal LS becomes an optimum value.

After completion of the positional adjustment of the light emitting device 12 in the X-axis direction, the light emitting device 12 is mechanically fixed and electrically connected to the board 18 by using the wire bonding portion 36 (see FIG. 1).

The optical module composed of the board 18, light emitting device 12, and optical waveguide 14 thus assembled is fixedly mounted on the housing 20 shown in FIG. 6.

A thermal conductive material may be inserted between the board 18 and the housing 20 in consideration of the mechanical strength as needed. For example, a heat sink or heat pipe made from aluminum, or an adhesive composed of silicon grease mixed with a copper powder may be used for improving the heat conductivity.

Figure 7:
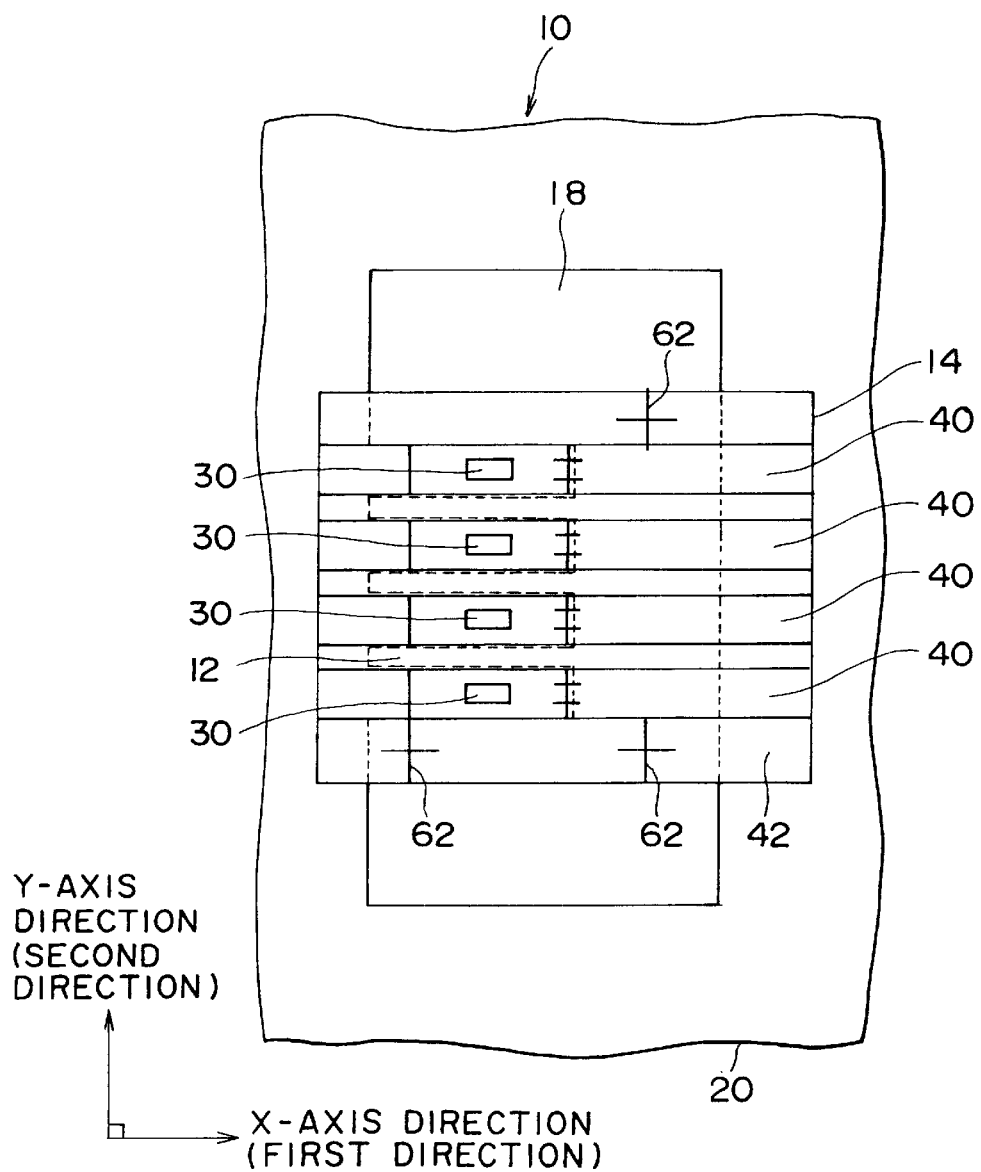
FIG. 7 is a plan view of an optical transmission system provided with light emitting units separated from each other for illustrating another method of manufacturing the optical transmission system according to the present invention.

The board 18 shown in FIGS. 5 and 6 is formed into a substantially U-shape; however, it may be formed into a comb shape as shown in FIGS. 7 and 8. Referring to FIGS. 7 and 8, the board 18 has a plurality (for example, four) of notches 60'. The light emitting units 30 of the light emitting device 12 are separately inserted in the notches 60'. Accordingly, the width W2 of each notch 60' is nearly equal to the width W3 of each light emitting unit 30. When each light emitting unit 30 is inserted in the corresponding notch 60', the position of the light emitting unit 30 is fixed in the Y-axis direction but is movable in the X-axis direction for adjustment.

The optical module composed of the board 18, optical waveguide 14 and light emitting device 12 shown in FIGS. 7 and 8 can be assembled in the same manner as that described with reference to FIGS. 5 and 6 except that light emitting units 30 are positioned to the end surfaces 42A of the corresponding core 40 separately from each other.

In this way, a plurality of the light emitting units 30 of the light emitting device 12 can be configured to be integrated with each other as shown in FIGS. 5 and 6 or to be independent from each other as shown in FIGS. 7 and 8.

Figure 9:
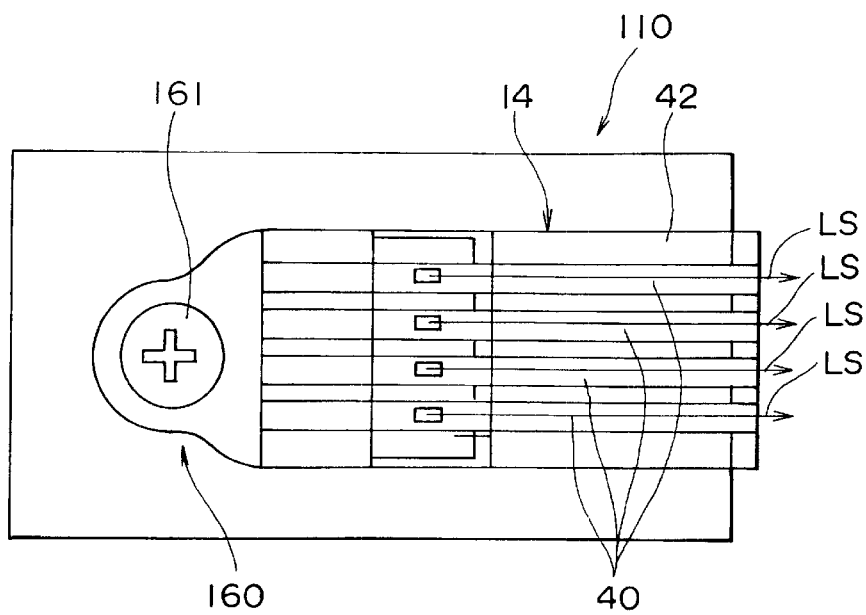
FIG. 9 is a plan view showing a positional adjustment example of the optical transmission system of the present invention in the Z-axis direction.
Figure 10:
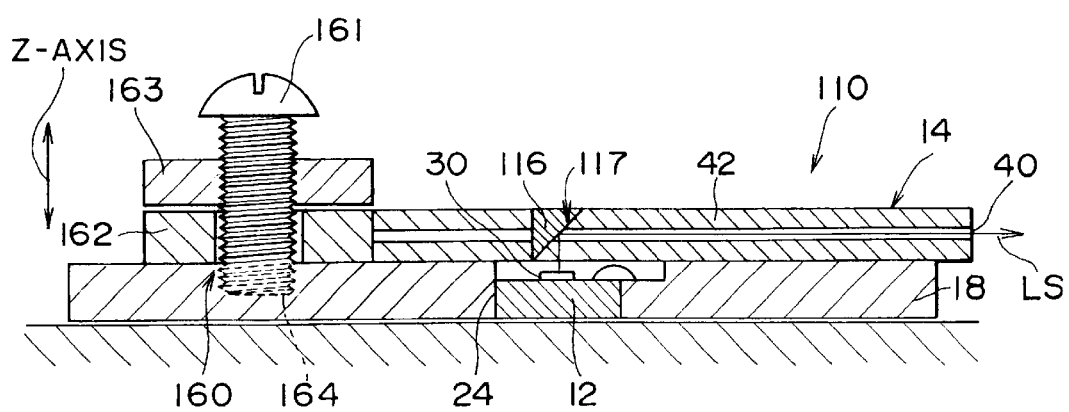
FIG. 10 is a sectional view of the optical transmission system shown in FIG. 9.

FIGS. 9 to 11 show a variation of the optical transmission system, for example, the optical transmission system 110 shown in FIG. 3. The variation of the optical transmission system 110 is additionally provided with a positional adjustment means 160 for realizing the positional adjustment of the optical waveguide 14 in the Z-axis direction.

The positional adjustment means 160 has a screw 161 and members 162 and 163. A lower end portion 164 of the screw 161 is rotatably mounted in the board 18 in order that the screw 161 is not removed from the board 18 even if it is rotated.

The members 162 and 163 are meshed with the screw 161. Accordingly, as shown in FIGS. 10 and 11, the height of the optical waveguide 14 can be adjusted in the Z-axis direction by rotating the screw 161. With this configuration, an optical signal LS is monitored by a measuring meter, and the output of the optical signal LS via the optical waveguide 14 is optimized for optimizing the optical signal LS.

FIG. 12 shows a heat radiation example of the optical transmission system of the present invention.

As described above, since the light emitting device 12 is directly mounted on the housing 20, heat generated from the light emitting device 12 can be radiated to the outside via the housing 20.

Similarly, the driver 29 for driving the light emitting device 12, which is mounted on the board 18, is brought into direct-contact with the housing 20. To be more specific, a projection 20A of the housing 20 is inserted in a hole 18E formed in the board 18 in such a manner as to be brought into direct-contact with the driver 29.

As a result, even if heat is generated from the driver 29 when the driver 29 drives the light emitting device 12, the heat is transferred to the housing 20 via the projection 20A and is radiated from the housing 20 to the outside.

In this way, the housing 20 serves as a heat transfer portion or a heat radiation portion for the heat generation devices such as the driver 29 and light emitting device 12.

Figure 13:
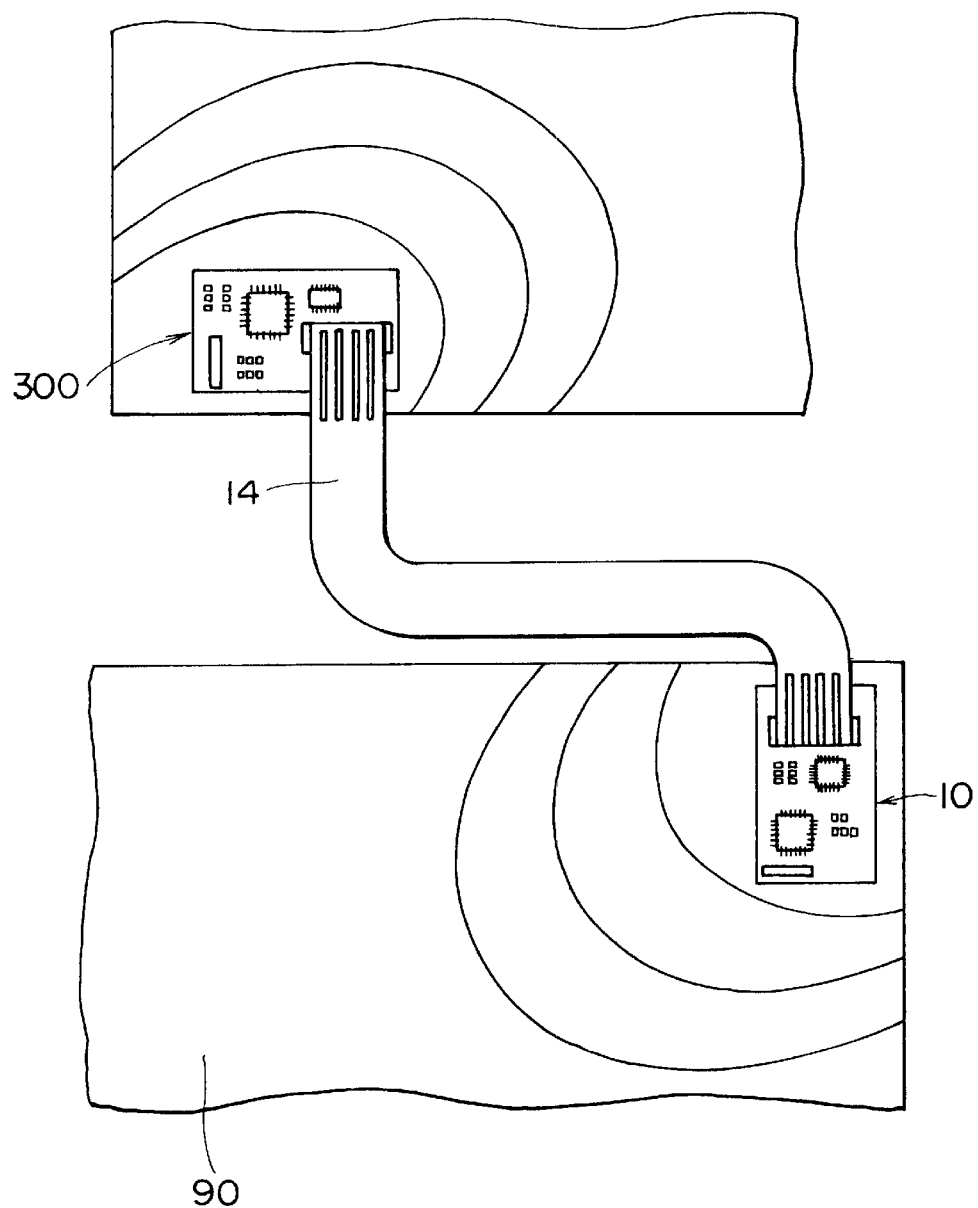
FIG. 13 is a view showing electronic equipment to which the optical transmission system of the present invention is applied.
Figure 14:
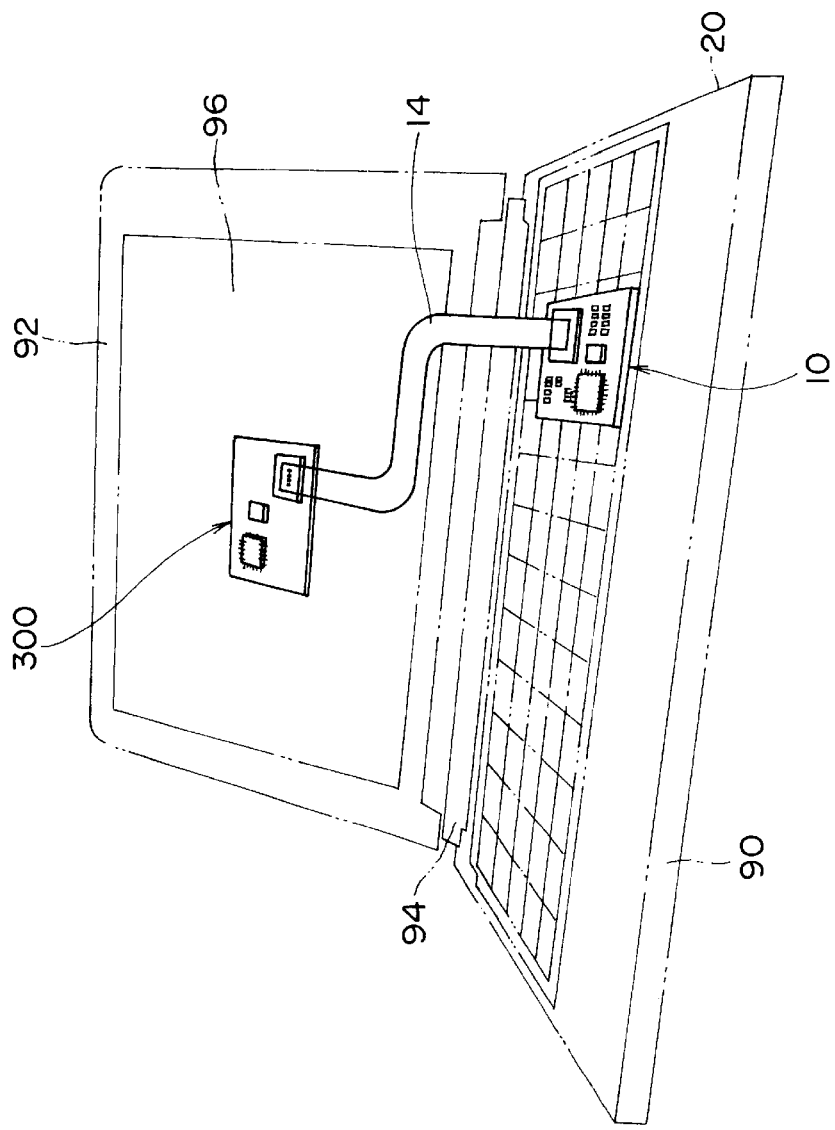
FIG. 14 is a perspective view showing an example of the electronic equipment shown in FIG. 13.

FIGS. 13 and 14 show an example in which the optical transmission system 10 of the present invention is applied to an actual electronic equipment.

The optical transmission system 10 is disposed in an operating main body 90. The electronic equipment shown in FIGS. 13 and 14 is represented by a portable computer having the main body 90 and a display 92. The display 92 having a liquid crystal display (LCD) 96 is foldable to the main body 9 via a connection portion 94.

The liquid crystal display 96 has a light receiving unit 300 for receiving an optical signal. The optical waveguide 14 is disposed between the light receiving unit 300 and the optical transmission system 10. The optical transmission system 10 is disposed on the housing 20 of the main body 90. An optical signal from the optical transmission system 10 travels through the optical waveguide 14, and reaches a light receiving device, for example, a photo-diode of the light receiving unit 300.

Figure 15:
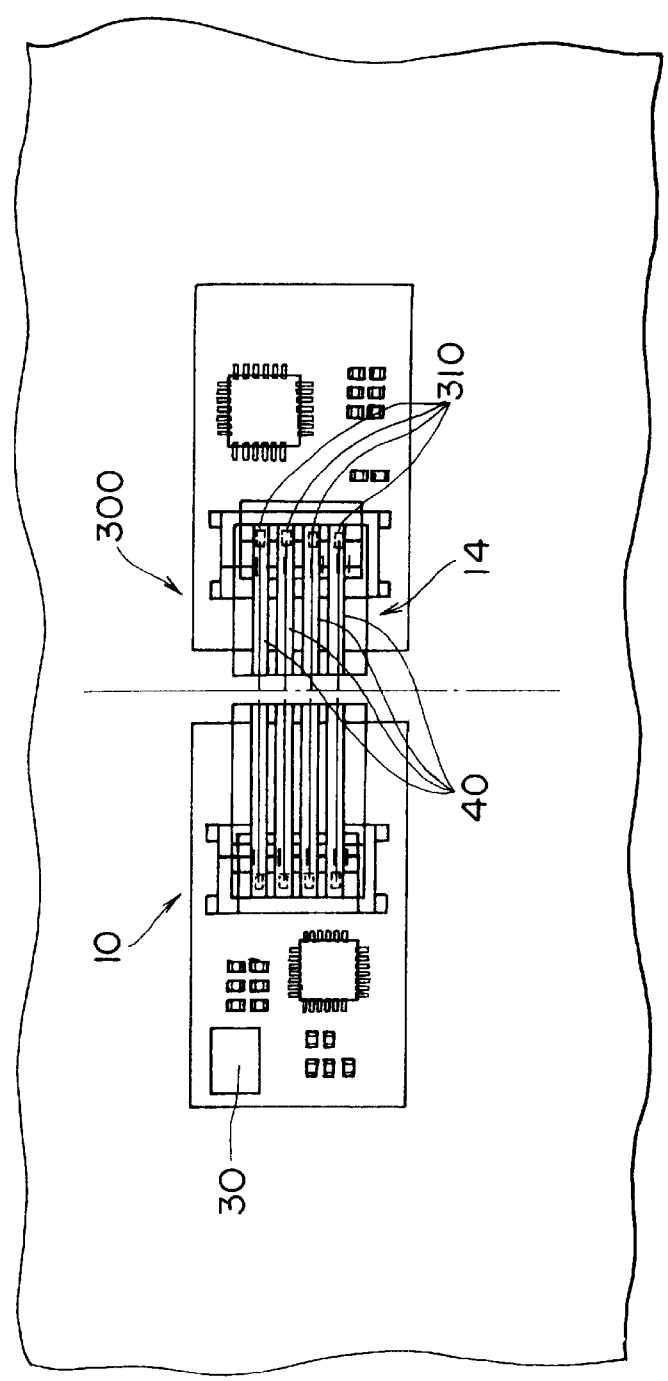
FIG. 15 is a plan view showing a configuration example of an optical transmission system and a light receiving unit of the electronic equipment shown in FIG. 14.

FIG. 15 shows a configuration example of the optical transmission 10 and the light receiving unit 300. The light receiving unit 300 has a configuration similar to that of the optical transmission system 10. The light receiving unit 300 can be obtained by replacing the light emitting device 12 of the optical transmission system 10 with a light receiving device such as a photo-diode. To be more specific, in the light receiving unit 300, light receiving devices 310 are disposed in such a manner as to correspond to the cores 40 of the optical waveguide 14.

According to the embodiments of the present invention, the direction of an optical signal generated by the light emitting device (plane emission laser) is changed by the reflecting means provided at the tilt portion of the optical waveguide.

To certainly achieve the positioning of the optical waveguide and board (on which the light emitting/light receiving devices have been mounted) in the X-axis direction and Y-axis direction, there may be adopted a configuration that holes are previously formed in the optical waveguide and board and a plurality of positioning dowels provided on the housing side are inserted in the holes. In the embodiments, the light emitting device is inserted in the notch (hole) of the board in such a manner as to be in contact with the housing for radiating heat generated by the light emitting device via the housing. The light receiving device may be similarly disposed for radiation of heat generated by the light receiving device.

According to the present invention, it is possible to realize the thinning of the optical transmission system. For example, the height of the optical transmission system configured as an optical integrated circuit system can be reduced to 2 mm or less.

The optical transmission system of the present invention is advantageous in eliminating a reduction in contact reliability caused in the conventional signal transmission via an electric wire, taking a suitable countermeasure against EMI (Electromagnetic Interference)/EMC (Electromagnetic Compatibility), and realizing high speed transmission of optical signals.

Since the heat radiation of the optical transmission system can be achieved not by use of a heat sink but by use of a housing made from a metal such as a magnesium alloy, it is possible to realize the miniaturization/thinning of the optical transmission system. Such an optical transmission system is expected to be used for an AV (Audio-Visual) equipment as a PDA (Personal Digital Assistant) equipment.

While the preferred embodiments have been described using specific terms, such description is for illustrative purposes only, and it is to be understood that changes and variations may be made without departing from the spirit or scope of the following claims.

What is claimed is:

1. An optical transmission system, comprising:
   a light emitting device;
   an optical waveguide portion positioned to and disposed adjacent to the light emitting device;
   a position adjuster configured to adjust a position of the light emitting device relative to a position of the optical waveguide portion along a direction in which an optical signal is generated by the light emitting device; and
   a reflector configured to redirect an optical signal generated by the light emitting device to the optical waveguide portion, wherein,
the optical waveguide portion comprises a plurality of cores configured to transmit the optical signal and comprises a cladding portion disposed about the cores,
the light emitting device comprises a plurality of light emitting units configured to separately generate the optical signals, and
the light emitting units are disposed in such a manner as to individually correspond to the cores.

2. An optical transmission system, comprising:
a light emitting device;
an optical waveguide portion positioned to and disposed on the light emitting device;
means for introducing an optical signal generated by the light emitting device to the optical waveguide portion; and
means for adjusting the position of the optical waveguide portion along the direction in which an optical signal is generated by the light emitting device, thereby adjusting the position of the optical waveguide portion to the light emitting device, wherein the means for adjusting comprises a member coupled to the optical waveguide portion and a threaded screw coupled through the member, and any rotational movement of the screw is configured to change the position of the optical waveguide portion along the direction in which the optical signal is generated by the light emitting device, wherein,
the optical waveguide portion comprises a plurality of cores configured to transmit the optical signal and comprises a cladding portion disposed about the cores,
the light emitting device comprises a plurality of light emitting units configured to separately generate the optical signals, and
the light emitting units are disposed in such a manner as to individually correspond to the cores.

3. An optical transmission system according to claim 2, wherein the means for introducing is disposed at an end portion of the optical waveguide portion.

4. An optical transmission system according to claim 2, wherein the means for introducing is disposed at a midpoint of the optical waveguide portion and wherein the means for adjusting comprises a member coupled to the optical waveguide portion and a threaded screw coupled through the member.

5. An optical transmission system according to claim 2, wherein the light emitting device is directly disposed on a heat transfer portion.

6. An optical transmission system according to claim 5, wherein the heat transfer portion is a housing of electric equipment.

7. An optical transmission system, comprising:
an optical waveguide comprising cladding disposed about a core;
a light emitting unit configured to emit an optical signal;
means for communicating the optical signal from the light emitting unit to the core of the optical waveguide along an optical signal path, wherein the means for communicating comprises a reflecting element disposed to intersect the core of the optical waveguide; and
means for adjusting the light emitting unit from a first position to a second position to alter the optical signal path, wherein the first position and the second position are measured relative to the means for communicating.

8. The optical transmission system of claim 7, wherein the reflecting element is at least one of a reflecting mirror and a reflecting prism.

9. The optical transmission system of claim 7, wherein the means for communicating further comprises the light emitting unit disposed to intersect the core of the optical waveguide.

10. The optical transmission system of claim 9, wherein the light emitting unit is further configured to emit a reference light, the optical transmission system further comprising:
means for monitoring the reference light.

11. The optical transmission system of claim 10, wherein the reference light is configured to travel along a reference light path and wherein the means for monitoring the reference light comprises a reflecting prism disposed relative to the reference light path.

12. The optical transmission system of claim 11, wherein the reflecting prism is disposed to confine the reference light to a predetermined space.

13. The optical transmission system of claim 7, wherein the means for communicating the optical signal from the light emitting unit to the core of the optical waveguide along an optical signal path excludes disposing an optical lens between the light emitting device and the optical waveguide.

14. The optical transmission system of claim 7, wherein the means for adjusting comprises a board having a notch, wherein the light emitting unit is disposed in the notch and the notch defines a shape that is configured to permit the light emitting unit to move from the first position to the second position.

15. The optical transmission system of claim 14, wherein the light emitting unit is a plurality of light emitting units, wherein the board comprises a plurality of partitions that separate the notch into a plurality of notches, and wherein each one light emitting unit is disposed in each notch of the plurality of notches.

16. The optical transmission system of claim 7, wherein the means for adjusting comprises a member coupled to the optical waveguide and a threaded screw coupled through the member, wherein movement of the screw is configured to change the position of the optical waveguide portion along the direction in which the optical signal is generated by the light emitting device.

17. The optical transmission system of claim 7, wherein the light emitting unit is disposed as part of a light emitting device, the optical transmission system further comprising:
a housing, wherein the light emitting device is disposed in direct contact with a housing.

18. The optical transmission system of claim 17, wherein the housing is configured to act as a heat sink.

19. The optical transmission system of claim 18, wherein the housing comprises a projection, the optical transmission system further comprising:
a driver disposed directly on the projection of the housing.

20. The optical transmission system of claim 7, further comprising:
a light receiving unit configured to receive the optical signal, wherein the reflecting element is disposed relative to the light receiving unit.

21. The optical transmission system of claim 20, further comprising:
a main body, wherein the light reflecting unit is disposed in the main body; and
a display, wherein the light receiving unit is disposed in a display.

22. The optical transmission system of claim 20, wherein the display is foldable relative to the main body.

* * * * *